(12) United States Patent
Cai (10) Patent No.: US 7,715,342 B2
(45) Date of Patent: May 11, 2010

(54) LOCATION OF PACKET DATA CONVERGENCE PROTOCOL IN A LONG-TERM EVOLUTION MULTIMEDIA BROADCAST MULTICAST SERVICE

(75) Inventor: Zhijun Cai, Euless, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 311 days.

(21) Appl. No.: 11/767,019

(22) Filed: Jun. 22, 2007

(65) Prior Publication Data

US 2008/0317052 A1 Dec. 25, 2008

(51) Int. Cl.
H04W 4/00 (2009.01)

(52) U.S. Cl. .................. 370/328; 370/401; 709/247; 455/422.1

(58) Field of Classification Search ................ None
See application file for complete search history.

(56) References Cited

U.S. PATENT DOCUMENTS

| 7,400,636 | B2* | 7/2008 | Kim et al. | 370/401 |
| 7,450,547 | B2* | 11/2008 | Kim et al. | 370/331 |
| 2002/0093938 | A1* | 7/2002 | Tourunen | 370/349 |
| 2004/0033801 | A1 | 2/2004 | Yi et al. | |
| 2004/0131026 | A1* | 7/2004 | Kim et al. | 370/328 |
| 2005/0074024 | A1 | 4/2005 | Kim et al. | |
| 2005/0094670 | A1 | 5/2005 | Kim | |
| 2005/0165945 | A1* | 7/2005 | Lee et al. | 709/232 |
| 2006/0094408 | A1 | 5/2006 | Hu et al. | |
| 2008/0045224 | A1* | 2/2008 | Lu et al. | 455/446 |
| 2008/0084837 | A1* | 4/2008 | Watanabe et al. | 370/312 |

FOREIGN PATENT DOCUMENTS

| EP | 1475984 A1 | 11/2004 |
| EP | 1505793 A1 | 2/2005 |
| EP | 1362453 B1 | 1/2006 |
| EP | 1729535 A1 | 12/2006 |

OTHER PUBLICATIONS

Cai, Zhijun, et al.; "Multi-Stage Setup for Long-Term Evolution Multimedia Broadcast Multicast Service Transmissions"; U.S. Appl. No. 11/741,362, filed Apr. 27, 2007; Specification 27 pgs.; 5 Drawings Sheets (Figs. 1-6).
PCT International Search Report; PCT Application No. PCT/CA2008/001012; Aug. 29, 2008; 3 pgs.

(Continued)

Primary Examiner—Daniel J Ryman
Assistant Examiner—Brian Roberts
(74) Attorney, Agent, or Firm—Conley Rose, P.C.; J. Robert Brown, Jr.

(57) ABSTRACT

A system for compressing an Internet Protocol (IP) header for a multimedia broadcast multicast service (MBMS) is provided. The system includes an access gateway and a plurality of cells, each of which has an enhanced node B (ENB). When the quantity of cells that will provide the MBMS is known to be one, execution of a packet data convergence protocol (PDCP)-based data compression function for the IP header occurs in the ENB of the one cell. When the quantity of cells that will provide the MBMS is not known to be one, execution of the PDCP-based data compression function occurs in the access gateway.

16 Claims, 8 Drawing Sheets

OTHER PUBLICATIONS

PCT Written Opinion of the International Searching Authority; PCT Application No. PCT/CA2008/001012; Aug. 29, 2008; 6 pgs.

3rd Generation Partnership Project; Technical Specification Group Radio Access Network; Evolved Universal Terrestrial Radio Access and Evolved Universal Terrestrial Radio Access Network; 3GPP TR 25.813 V7.1.0; Sep. 2006; 41 pgs.

3rd Generation Partnership Project; Technical Specification Group Radio Access Network; Evolved Universal Terrestrial Radio Access and Evolved Universal Terrestrial Radio Access Network; 3GPP TS 36.300 V8.0.0; Mar. 2007; 82 pgs.

EP Search and Examination Report; EP Application No. 07113401; Jan. 31, 2008; 6 pgs.

* cited by examiner

LOCATION OF PACKET DATA CONVERGENCE PROTOCOL IN A LONG-TERM EVOLUTION MULTIMEDIA BROADCAST MULTICAST SERVICE

BACKGROUND

In traditional wireless telecommunications systems, transmission equipment in a base station transmits signals throughout a geographic region known as a cell. As technology has evolved, more advanced equipment has been introduced that can provide services that were difficult previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. Devices that might be used by users in a telecommunications network can include both mobile terminals, such as mobile telephones, personal digital assistants, handheld computers, portable computers, laptop computers, tablet computers and similar devices, and fixed terminals, such as residential gateways, televisions, set-top boxes, and the like. Such mobile and fixed devices will be referred to herein as user equipment or UE.

A group of LTE-based cells might be under the control of a single entity known as a central control. The central control typically manages and coordinates certain activities with a group of cells such as scheduling the transmission of broadcast/multicast services from the ENBs under its control to the UEs being served by the ENBs.

Services that might be provided by LTE-based equipment can include broadcasts or multicasts of television programs, streaming video, streaming audio, and other multimedia and non-multimedia content. Such services are commonly referred to as multimedia broadcast multicast services (MBMS). An MBMS might be transmitted throughout a single cell or throughout several contiguous or overlapping cells. A set of cells receiving an MBMS can be referred to as a service area. A service area and a region under the control of a central control do not necessarily coincide. For example, a central control might specify that a first subset of cells under its control will deliver a first MBMS and that a second subset of cells under its control will deliver a second MBMS.

An MBMS may be communicated from an ENB to a UE using point-to-point (PTP) communication or point-to-multipoint (PTM) communication. PTP communication, also known as unicast communication, is similar to conventional cellular network communication in that there is a dedicated radio bearer between the ENB and a UE. PTP communication from the ENB may enable high quality communication with the UE. However, when an ENB communicates with a large number of UEs using PTP communication, a substantial amount of overhead may be required for establishing and maintaining the PTP communications and a substantial amount of the available spectrum may be occupied.

PTM communication may include utilizing a dedicated channel or dedicated carrier to transmit data or services to multiple UEs. While a certain amount of overhead may be required to initiate a PTM communication, the overhead is relatively small and may not vary in relation to the number of UEs. That is, as more UEs utilize the data or services, the overhead required to establish and maintain the broadcast PTM communication remains approximately the same. PTM communications may also improve spectral efficiency as the number of UEs increases because no new transmissions are required for newly added users. In some cases, the quality of PTM communications may be worse than that for PTP communications since there is little or no communication from the UEs to the ENB, and because of power considerations and other factors that may reduce the relative quality of the communication.

Transmission of data or services by PTM communication might be either a broadcast or a multicast. A broadcast is a PTM transmission that is freely available to UEs within range of the transmission. A multicast is a PTM transmission that is available only to UEs that have subscribed to or have otherwise been granted access to the transmission. Hereinafter, the terms unicast, broadcast, and multicast might be used interchangeably to refer to any transmission of data or services from an ENB to one or more UEs.

In some LTE telecommunications networks, data is transmitted in Internet Protocol (IP) packets. The IP packets include headers that contain information about the data carried by the packets. In Internet Protocol Version 4 (IPv4), the header is typically 40 bytes long including the Transport Control Protocol header and Real-Time Protocol header and in Internet Protocol Version 6 (IPv6), the header is typically 60 bytes long including the Transport Control Protocol header and Real-Time Protocol header. Due to this large size, the data in an IP header might be compressed to increase the efficiency of IP packet transmissions. The compression is typically carried out by a software and/or hardware component known as the Packet Data Convergence Protocol (PDCP).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system for compressing an Internet Protocol (IP) header for a multimedia broadcast multicast service (MBMS) is provided. The system includes an access gateway and a plurality of cells, each of which has an enhanced node B (ENB). When the quantity of cells that will provide the MBMS is known to be one, execution of a packet data convergence protocol (PDCP)-based data compression function for the IP header occurs in the ENB of the one cell. When the quantity of cells that will provide the MBMS is not known to be one, execution of the PDCP-based data compression function occurs in the access gateway.

In another embodiment, a wireless telecommunications network is provided. The network includes an access gateway and a plurality of cells, each of which has an ENB. When the quantity of cells that will provide a service is known prior to the providing of the service, the location of execution of a PDCP-based data compression function for an IP header related to the service is determined based on the quantity. When the quantity of cells that will provide the service is not known prior to the providing of the service, the execution of the PDCP-based data compression function occurs on the access gateway.

In another embodiment, a method for specifying a location for execution of a PDCP-based data compression function for a service in a wireless telecommunications network including a plurality of cells is provided. The method includes, when the quantity of cells that will provide the service is known, prior to the providing of the service, to be greater than one, executing the PDCP-based data compression function in a component of the network that is capable of communicating with the plurality of cells substantially simultaneously. The method further includes, when the quantity of cells that will provide the service is not known prior to the providing of the service, executing the PDCP-based data compression function in the component of the network that is capable of communicating with the plurality of cells substantially simultaneously The method further includes, when the quantity of the cells that will provide the service is known, prior to the providing of the service, to be one, executing the PDCP-based data compression function in an ENB in the one cell that will provide the service.

Figure 1:
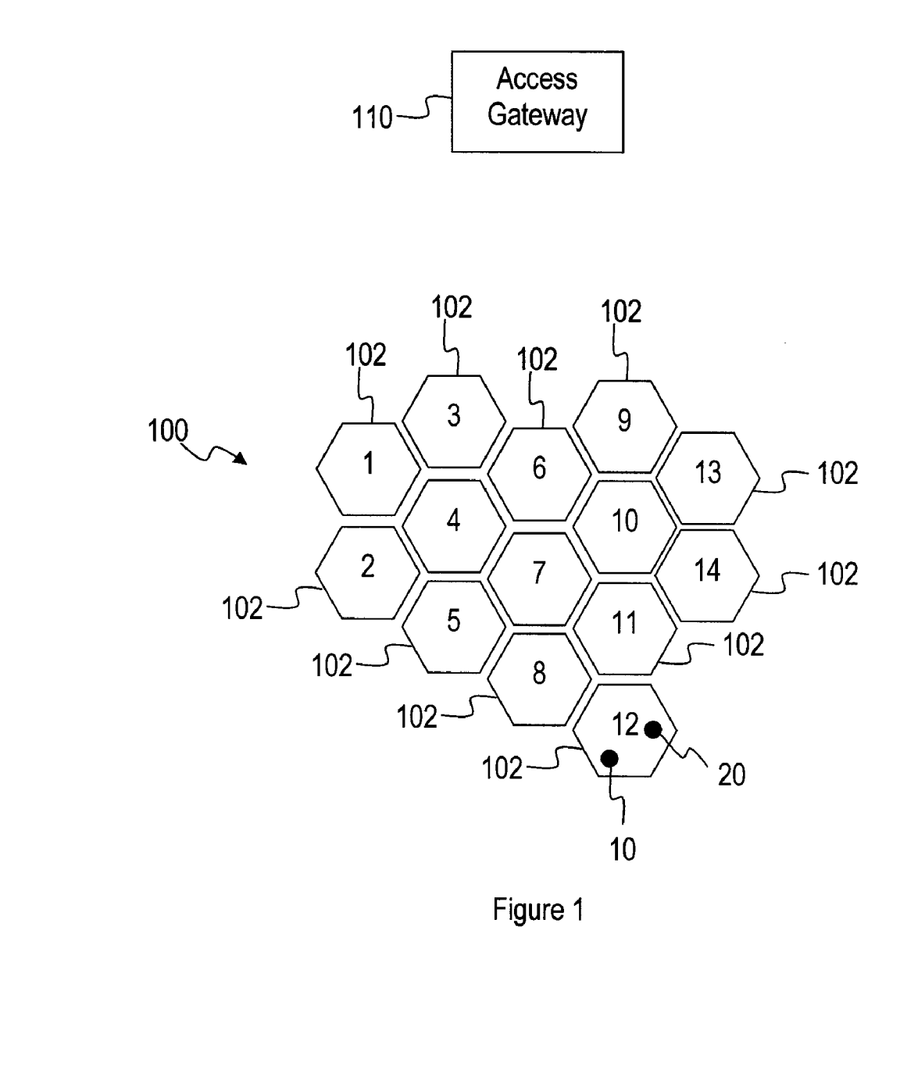
FIG. 1 is an illustration of a cellular network according to an embodiment of the disclosure.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from an enhanced node B (ENB). While the cells 102 are depicted as having non-overlapping coverage areas, persons of ordinary skill in the art will recognize that one or more of the cells 102 may have partially overlapping coverage with adjacent cells. Further, while fourteen cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one of the cells 102, namely cell $102_{12}$, it will be apparent to one of skill in the art that a plurality of UEs 10 might be present in each of the cells 102. An ENB 20 in each of the cells 102 performs functions similar to those of a traditional base station. That is, the ENBs 20 provide a radio link between the UEs 10 and other components in a telecommunications network. While the ENB 20 is shown only in cell $102_{12}$, it should be understood that an ENB would be present in each of the cells 102. Also, radio links other than the ENBs 20 could be used.

An access gateway 110 acts as an intermediary between the cellular network 100 and other types of networks, such as the Internet. The access gateway 110 is capable of communicating substantially simultaneously with the cells 102 in the cellular network 100. Other components that are not shown, such as a central controller, may also be capable of communicating with the cells 102 and providing centralized management and coordination for the cells 102 and their corresponding ENBs 20. Functions that are described herein as occurring in the access gateway 110 should be understood as also possibly occurring in the central controller or in some other component that is capable of communicating with a plurality of the cells 102 substantially simultaneously.

Each of the cells 102 within the cellular network 100 may operate to communicate MBMS services to the UEs 10 in its region of coverage using PTP communication and/or using PTM communication. In some embodiments, some of the cells 102 may operate to communicate services using only PTP communication and some of the cells 102 may operate to communicate services using only PTM communication.

Figure 2:
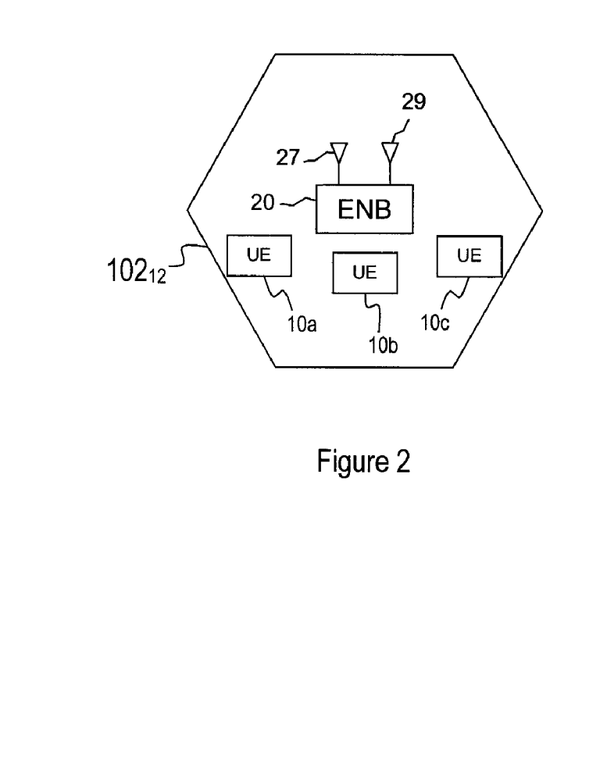
FIG. 2 is an illustration of a cell in the cellular network according to an embodiment of the disclosure.

In the present disclosure, the cellular systems or cells 102 may be described as engaged in certain activities, such as transmitting signals. However, as will be readily apparent to one skilled in the art, these activities would in fact be conducted by components comprising the cells 102. As an example, FIG. 2 depicts a more detailed view of the cell $102_{12}$. The ENB 20 in cell $102_{12}$ can promote communication via a transmitter 27, a receiver 29, and/or other well known equipment. Similar equipment might be present in the ENBs 20 in the other cells 102. A plurality of UEs 10 are present in the cell $102_{12}$, as might be the case in the other cells 102.

In an embodiment, the PDCP-based compression of IP headers can occur in the access gateway 110 in some circumstances and in one or more of the ENBs 20 in other circumstances. In cases where it is known that a particular MBMS will be provided in only one of the cells 102 in the cellular network 100, the PDCP-based compression of IP headers for that MBMS can occur in the ENB 20 for that cell 102. When it is known that an MBMS will be provided in a plurality of the cells 102 or when there is a possibility that an MBMS will be provided in a plurality of the cells 102, the PDCP-based compression of IP headers for that MBMS can occur in the access gateway 110.

One of skill in the art will recognize that the software and/or hardware that carries out the PDCP-based compression of IP headers might reside in the access gateway 110 as well as in all of the ENBs 20 in the network 100. In an embodiment, the execution of this PDCP-based functionality for a particular MBMS occurs either in the access gateway 110 or in one of the ENBs 20 but not in both. Hereinafter, references to placing the execution of the PDCP functionality in a particular location and similar references should be understood to refer to causing the PDCP-based compression of IP headers for a particular MBMS to occur in that location, rather than to placing the data compression software and/or hardware in that location. Also, it should be understood that when the execution of the PDCP functionality for an MBMS is placed in a particular location, the execution of the PDCP functionality for other MBMSs may or may not be occurring in that location substantially simultaneously.

Placing the execution of the PDCP functionality in one of the ENBs 20 can improve data transmission efficiency and allow the PDCP functionality to react quickly to changing radio conditions. However, if the execution of the PDCP functionality for an MBMS that was being broadcast in multiple cells 102 were placed in each of the ENBs 20 for those cells 102, each of the ENBs 20 would perform the IP header compression separately. The ENBs 20 might need to coordinate among themselves to ensure that the IP header compression occurred consistently and substantially simultaneously. This coordination might require a great deal of complex communication between the ENBs 20 via the access gateway 110. Placing the execution of the PDCP functionality in the access gateway 110 in such cases allows the access gateway 110 to perform the IP header compression only one time for all of the cells 102 broadcasting the MBMS. The access gateway 110 can then transmit the compressed data to the ENBs 20 for those cells 102 substantially simultaneously. The complex communications that might be needed between the ENBs 20 to bring about a coordinated IP header compression can thus be avoided.

Figure 3:
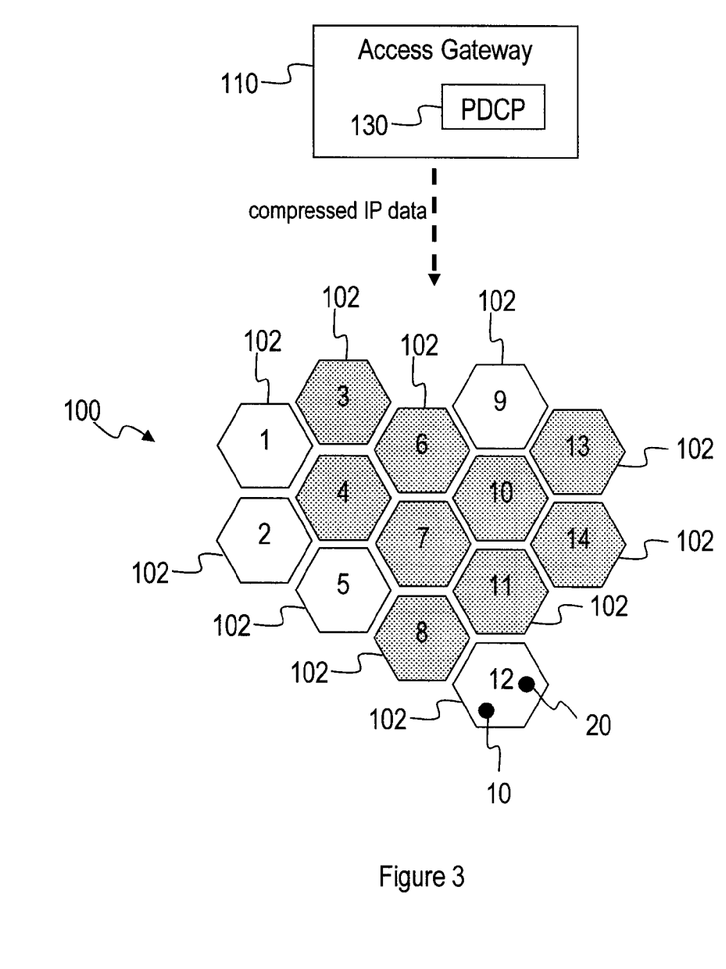
FIG. 3 is an illustration of the cellular network according to another embodiment of the disclosure.

FIG. 3 illustrates a situation where an MBMS has been preconfigured to be broadcast in a plurality of cells 102, in this case, cells $102_3$, $102_4$, $102_6$, $102_7$, $102_8$, $102_{10}$, $102_{11}$, $102_{13}$, and $102_{14}$. That is, it is known prior to the transmission of the MBMS that the MBMS will be broadcast only in those specific cells. The access gateway 110 can communicate with the cells 102 in the network 100. While the access gateway 110 is depicted outside the network 100, the access gateway 110 can be considered a component within the network 100. The access gateway 110 includes a component 130 that can execute the PDCP-based IP header compression. Although not shown, a similar PDCP component 130 might also be present in the ENBs 20 in each of the cells 102.

In this embodiment, the execution of the PDCP functionality 130 for an MBMS occurs on the access gateway 110 since it is known that that MBMS will be provided to more than one cell 102. In this way, the IP header compression can be performed by the PDCP component 130 in the access gateway 110 on behalf of all the cells $102_3$, $102_4$, $102_6$, $102_7$, $102_8$, $102_{10}$, $102_{11}$, $102_{13}$, and $102_{14}$ that will be broadcasting that MBMS. The access gateway 110 can then provide the compressed IP data to those cells $102_3$, $102_4$, $102_6$, $102_7$, $102_8$, $102_{10}$, $102_{11}$, $102_{13}$, and $102_{14}$. If the execution of the PDCP functionality had instead been placed in the ENBs 20 of each of the cells $102_3$, $102_4$, $102_6$, $102_7$, $102_8$, $102_{10}$, $102_{11}$, $102_{13}$, and $102_{14}$, each of the cells $102_3$, $102_4$, $102_6$, $102_7$, $102_8$, $102_{10}$, $102_{11}$, $102_{13}$, and $102_{14}$ would have performed IP header compression separately. Complex signaling would have been needed between the access gateway 110 and the cells $102_3$, $102_4$, $102_6$, $102_7$, $102_8$, $102_{10}$, $102_{11}$, $102_{13}$, and $102_{14}$ to ensure that the IP header compression was done consistently by those ENBs 20.

Figure 4:
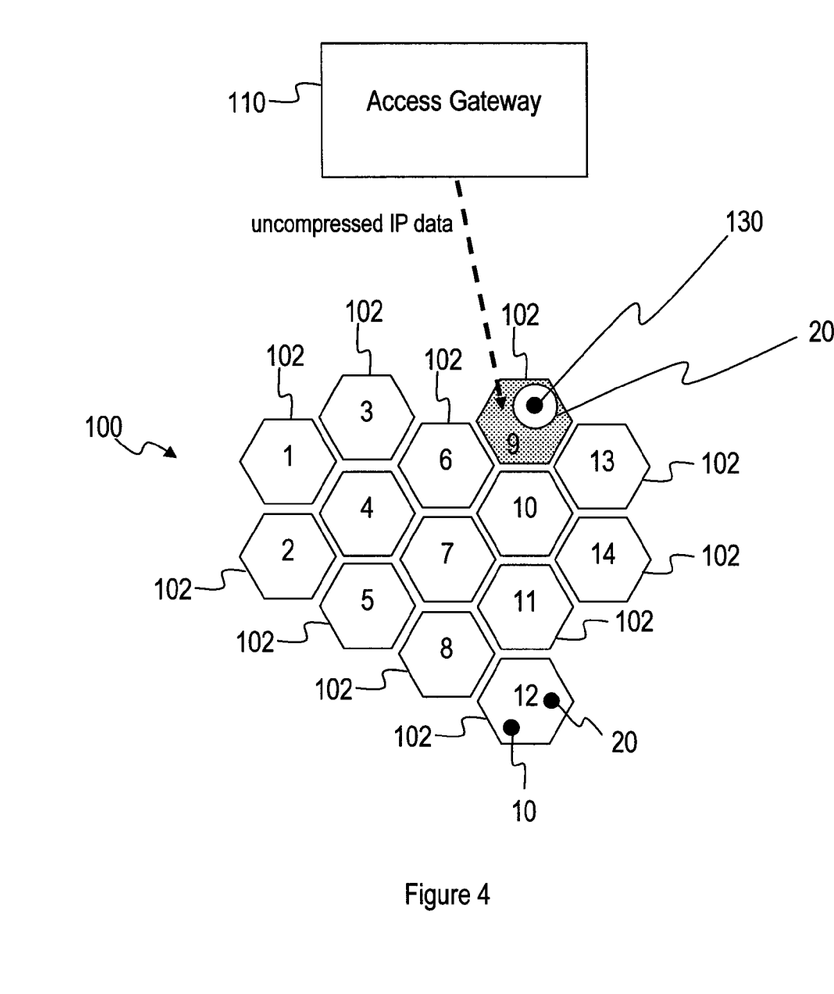
FIG. 4 is an illustration of the cellular network according to another embodiment of the disclosure.

FIG. 4 illustrates a situation where an MBMS has been preconfigured to be broadcast in only one of the cells 102, in this case, cell $102_9$. That is, it is known prior to the transmission of the MBMS that the MBMS will be broadcast only in cell $102_9$ and none of the other cells 102. In this case, the execution of the PDCP functionality for the MBMS can occur in the PDCP component 130 in the ENB 20 for cell $102_9$. The access gateway 110 can send uncompressed IP data to cell $102_9$ and the PDCP component 130 in the ENB 20 for cell $102_9$ can compress the IP header data. By having the execution of the PDCP functionality occur in the ENB 20, the PDCP component 130 can quickly adapt to radio condition trends and radio efficiency can thus be improved in the cell $102_9$.

Figure 5A:
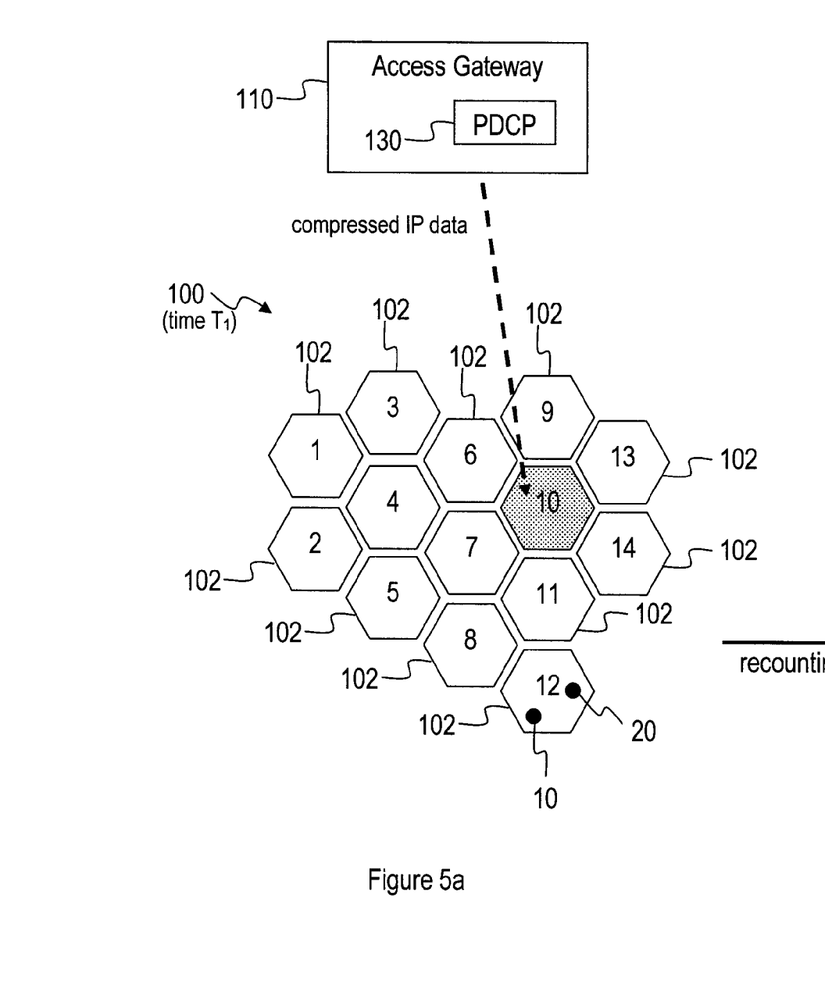
FIG. 5a is an illustration of the cellular network according to another embodiment of the disclosure.
Figure 5B:
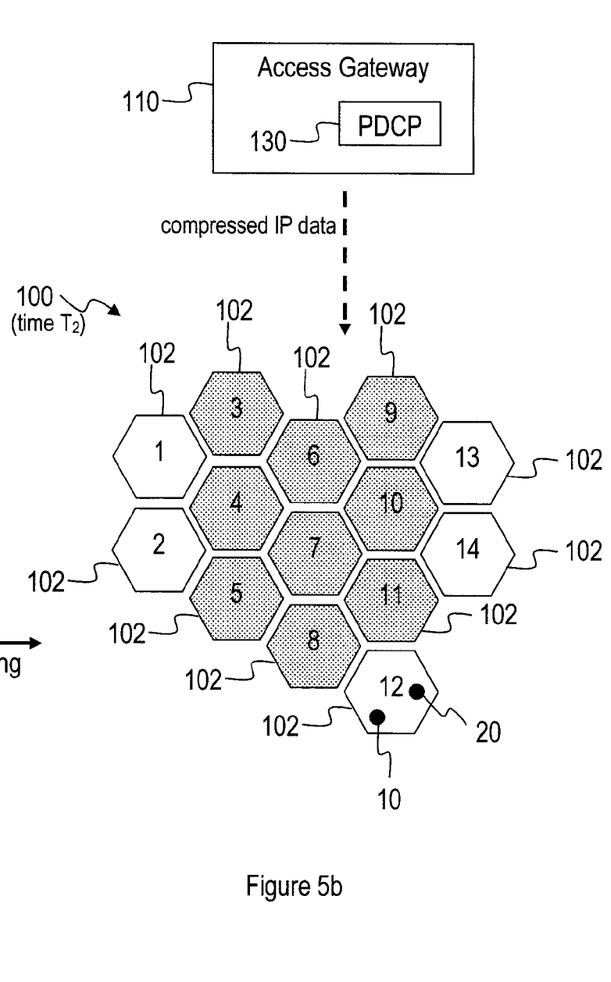
FIG. 5b is an illustration of the cellular network according to another embodiment of the disclosure.

FIGS. 5a and 5b illustrate situations where the number of cells 102 that will be broadcasting an MBMS is not known prior to the transmission of the MBMS. In such cases, an automated counting procedure might be employed to determine the number of UEs 10 in the cells 102 that are interested in receiving the MBMS. The MBMS might then be broadcast in the cells 102 that have interested UEs 10. A standard counting algorithm, such as that defined in the universal mobile telecommunications system (UMTS) release 6 (R6), may be implemented to determine how many UEs 10 are interested in receiving the MBMS. Alternatively, other standard counting procedures may be used or a streamlined counting procedure might be followed, such as that described in U.S. patent application Ser. No. 11/737,977, filed on Apr. 20, 2007, inventor Zhijun Cai, entitled "Polling Method and Apparatus for Long Term Evolution Multimedia Broadcast Multicast Services," which is incorporated herein by reference for all purposes.

The counting procedure might be dynamic in that a record can be kept of the number of interested UEs 10 entering and exiting the cells 102, the number of UEs 10 remaining in one of the cells 102 and expressing a new interest in the MBMS, and the number of UEs 10 remaining in one of the cells 102 and renouncing a previously expressed interest in the MBMS. In this way, a running total can be maintained of the number of cells 102 that have interested UEs 10 at different points in time.

FIG. 5a illustrates the network 100 at a first time, time $T_1$. At this time, a UE 10 that has expressed an interest in receiving an MBMS has been counted in only one of the cells 102, namely cell $102_{10}$. In other cases, a different number of cells 102 might have interested UEs 10. The situation of FIG. 5a may appear to be similar to the situation depicted in FIG. 4, but there are differences that are relevant to where the execution of the PDCP functionality will be located. In FIG. 4, an MBMS is preconfigured to be provided in only one of the cells 102 and therefore the execution of the PDCP functionality can be placed in the ENB 20 for that cell 102. In FIG. 5a, an MBMS is being provided only in cell $102_{10}$ at time $T_1$, but at future times the MBMS might be provided in additional cells 102 or in different cells 102. For example, if a recounting of the cells 102 that have interested UEs 10 occurs at time $T_2$, it may be discovered that cells $102_3$, $102_4$, $102_5$, $102_6$, $102_7$, $102_8$, $102_9$, $102_{10}$, and $102_{11}$ contain UEs 10 that are interested in the MBMS, as shown in FIG. 5b. Since there are multiple cells 102 in which the MBMS is to be broadcast, it is desirable to place the execution of the PDCP functionality in the access gateway 110 in this case for the reasons discussed above.

If the execution of the PDCP functionality 130 for the MBMS was instead placed in the ENB 20 for cell $102_{10}$ and if a plurality of cells 102 became interested in the MBMS at a later time, it may not be possible or desirable to move the execution of the PDCP functionality from the ENB 20 for cell $102_{10}$ to the access gateway 110 to accommodate the additional interested cells 102. Therefore, in an embodiment, the execution of the PDCP functionality occurs in the access gateway 110 when the number of cells 102 that have UEs 10 interested in an MBMS is not known or might change overtime.

It can be seen that FIGS. 3 and 4 depict situations where the number of cells 102 that have UEs 10 interested in an MBMS is known prior to the MBMS being provided and where this number remains fixed. In such cases, the location where the execution of the PDCP functionality will occur is determined by the number of interested cells 102. When it is known that the number of interested cells 102 will remain at exactly one, the execution of the PDCP functionality occurs in the ENB 20 for that cell 102. When the number of interested cells 102 is fixed and is greater than one, the execution of the PDCP functionality occurs in the access gateway 110. FIGS. 5a and 5b, on the other hand, depict situations where the number of cells 102 that have UEs 10 interested in an MBMS might vary. In such cases, the execution of the PDCP functionality occurs in the access gateway 110.

From another perspective, it can be seen that FIG. 4 depicts a situation where an MBMS is preconfigured to be provided in only one cell 102. In such a case, the execution of the PDCP functionality occurs in the ENB 20 for that cell 102. In any other situation, such as those depicted in FIGS. 3, 5a, and 5b, the execution of the PDCP functionality occurs in the access gateway 110.

Figure 6:
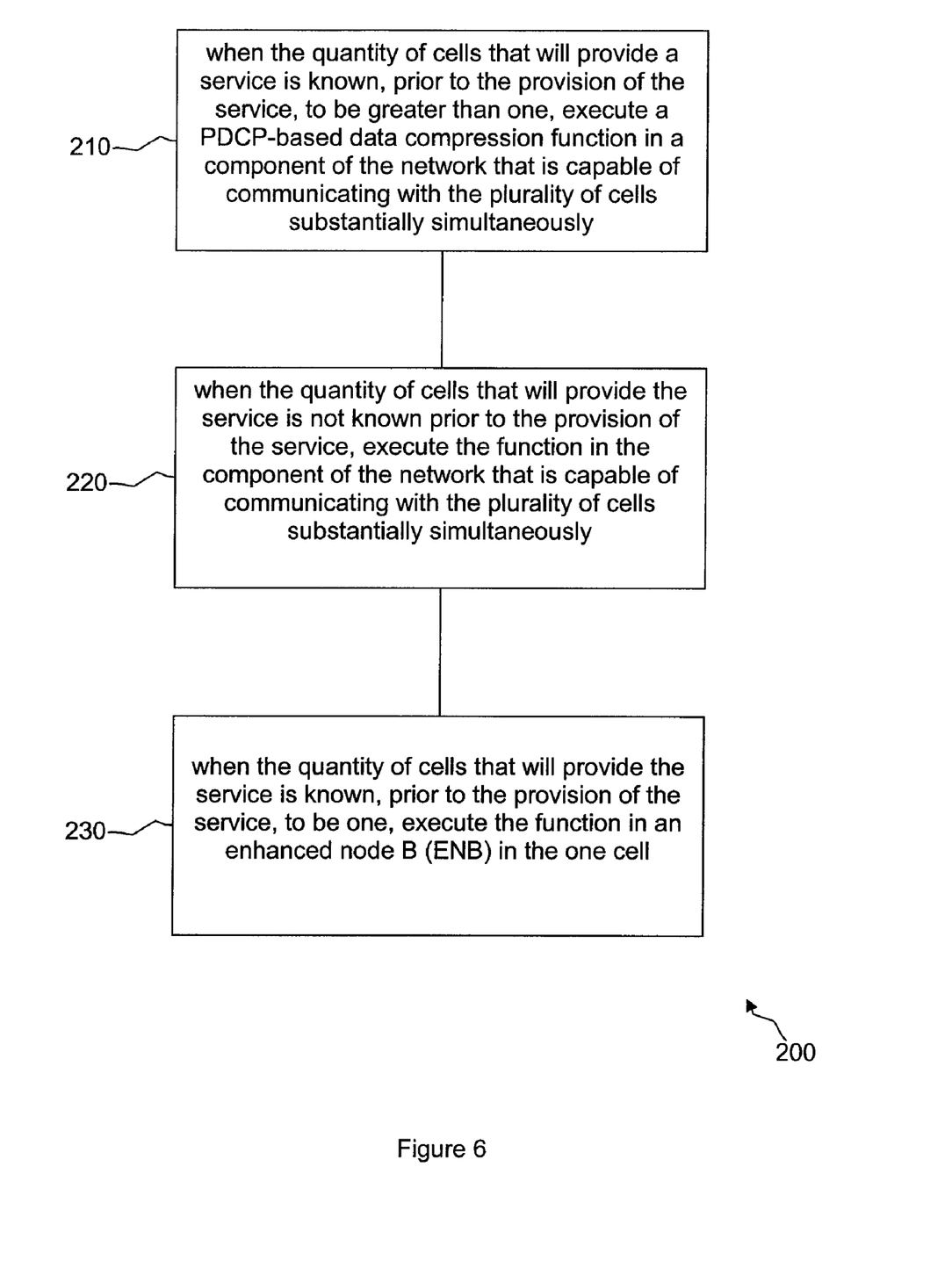
FIG. 6 is a diagram of a method for specifying a location for execution of a PDCP-based data compression function for a service in a plurality of cells in a wireless telecommunications network according to an embodiment of the disclosure.

FIG. 6 illustrates an embodiment of a method 200 for specifying a location for execution of a PDCP-based data compression function for a service in a plurality of cells in a wireless telecommunications network. In block 210, when the quantity of cells that will provide the service is known, prior to the provision of the service, to be greater than one, the function is executed in a component of the network that is capable of communicating with the plurality of cells substantially simultaneously, such as, but not limited to, an access gateway or a central control. In block 220, when the quantity of cells that will provide the service is not known prior to the provision of the service, the function is executed in the component of the network that is capable of communicating with the plurality of cells substantially simultaneously. In block 230, when the quantity of cells that will provide the service is known, prior to the provision of the service, to be one, the function is executed in an ENB in the one cell.

Figure 7:
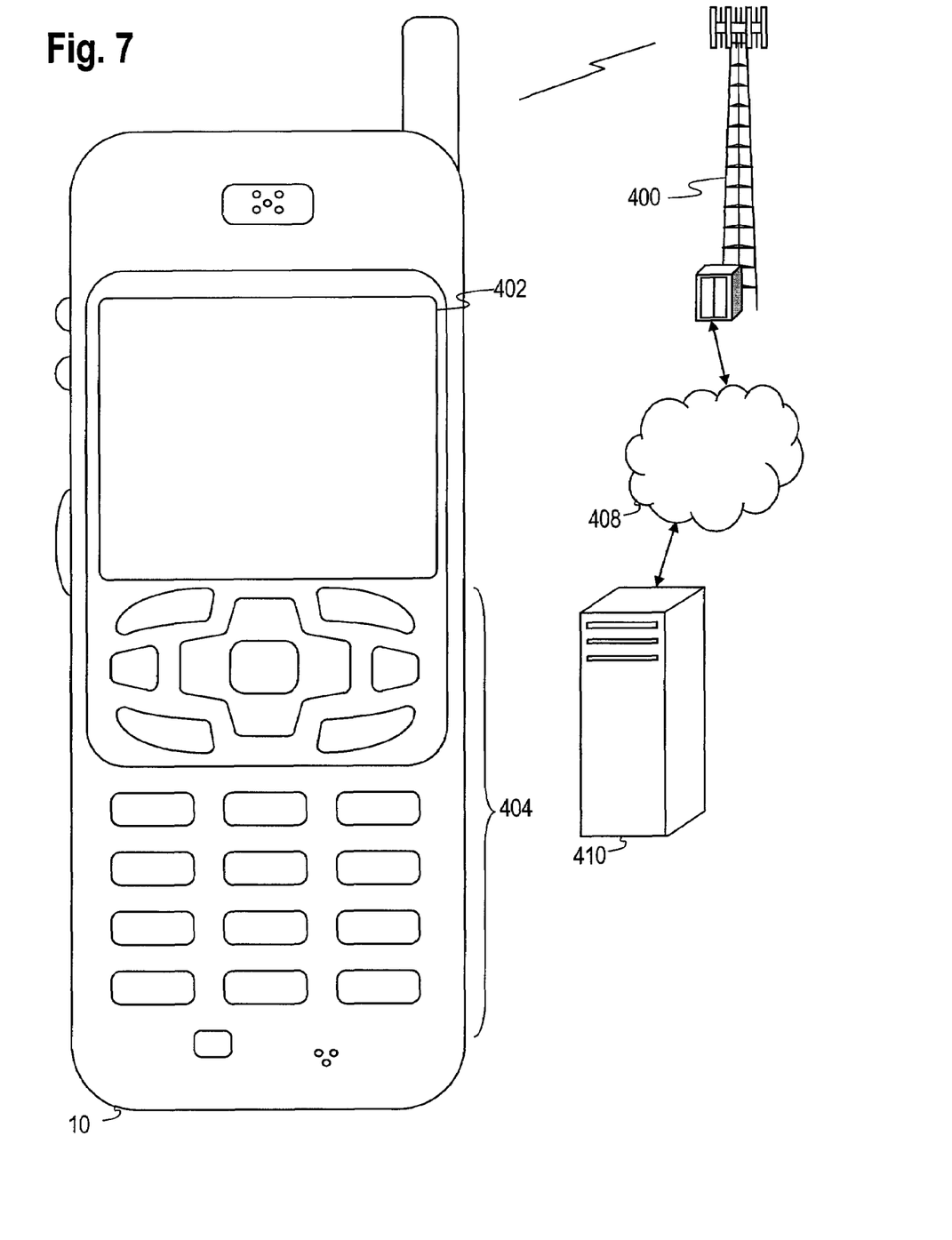
FIG. 7 is a diagram of a wireless communications system including user equipment operable for some of the various embodiments of the disclosure.

FIG. 7 illustrates a wireless communications system including an embodiment of one of the UEs 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, wireless handset, pager, or PDA. In another embodiment, the UE 10 may be a portable, laptop or other computing device.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct. The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction.

Among the various applications executable by the UE 10 are a web browser, which enables the display 402 to show a web page. The web page is obtained via wireless communications with a wireless network access node, a cell tower, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402.

Figure 8:
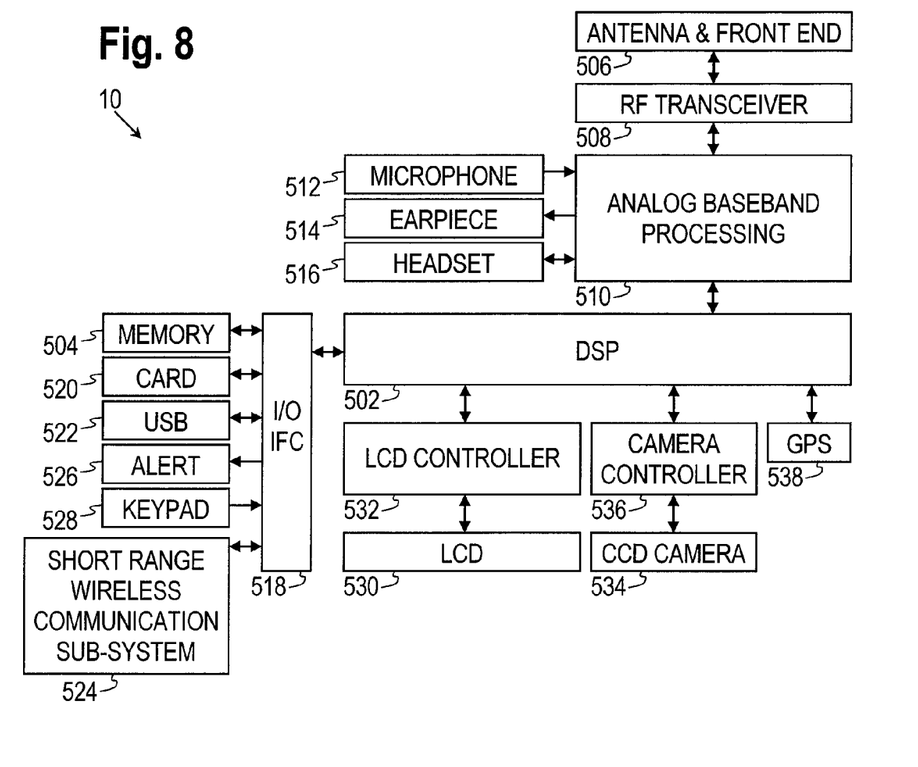
FIG. 8 is a block diagram of user equipment operable for some of the various embodiments of the disclosure.

FIG. 8 shows a block diagram of the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538.

The DSP 502 or some other form of controller or central processing unit operates to control the various components of the UE 10 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. The GPS sensor 538 is coupled to the DSP 502 to decode global positioning system signals, thereby enabling the UE 10 to determine its position. Various other peripherals may also be included to provide additional functions, e.g., radio and television reception.

Figure 9:
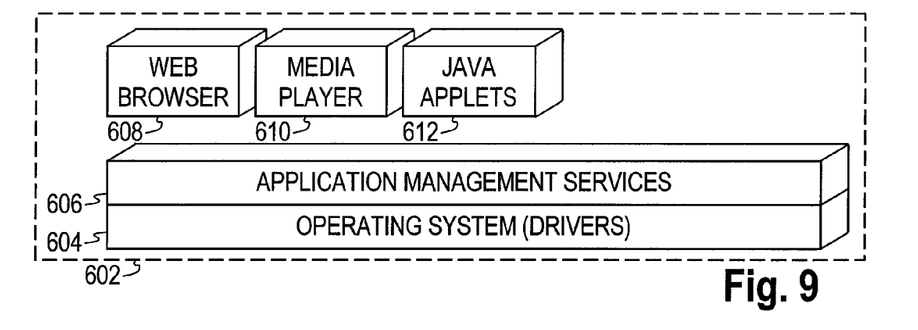
FIG. 9 is a diagram of a software environment that may be implemented on user equipment operable for some of the various embodiments of the disclosure.

FIG. 9 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 10. Also shown in FIG. 9 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audio-visual media. The Java applets 612 configure the UE 10 to provide games, utilities, and other functionality.

Figure 10:
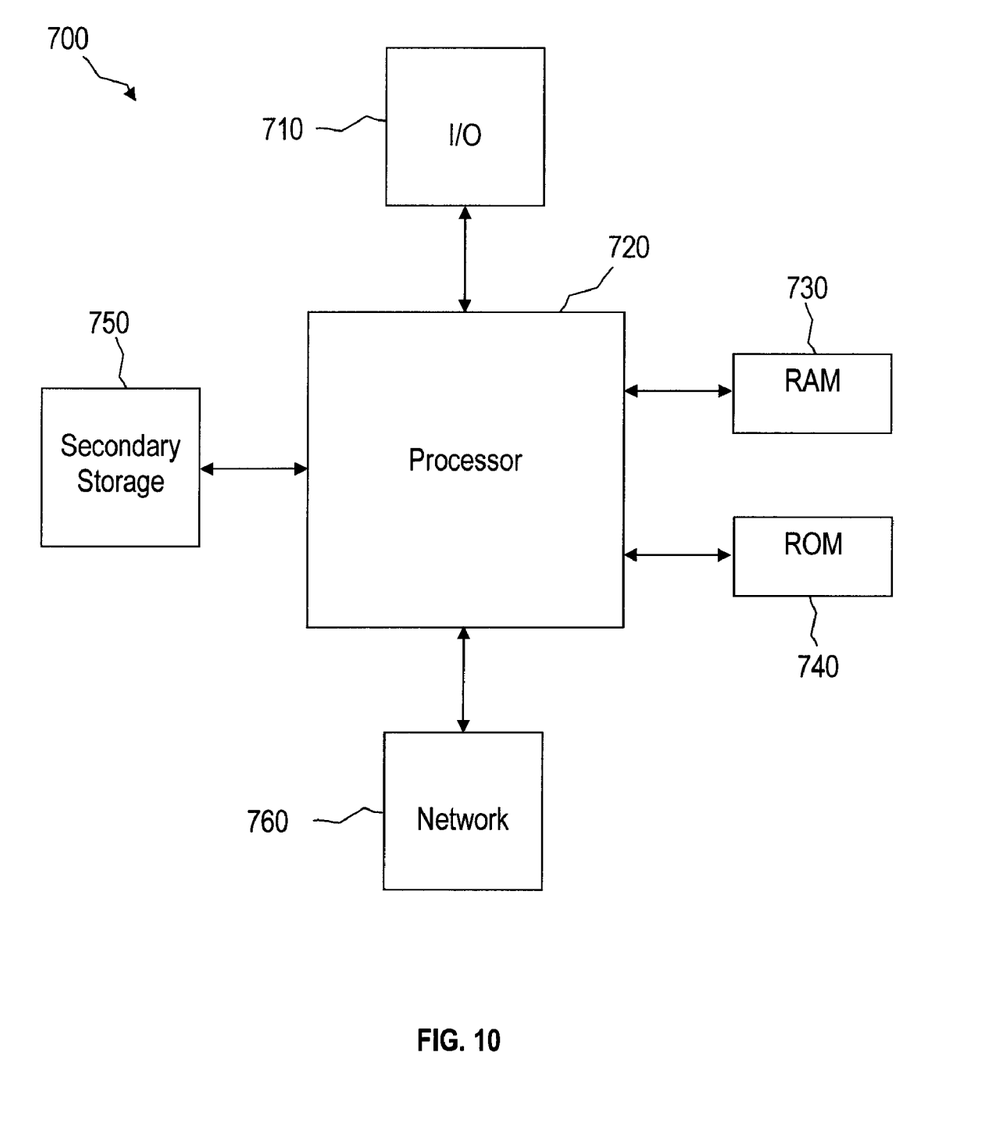
FIG. 10 is an illustrative general purpose computer system suitable for some of the various embodiments of the disclosure.

The ENB 20, the access gateway 110, and other components that might be associated with the cells 102 may include any general-purpose computer with sufficient processing power, memory resources, and network throughput capability to handle the necessary workload placed upon it. FIG. 10 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for compressing an Internet Protocol (IP) header for a multimedia broadcast multicast service (MBMS), comprising:
   an access gateway; and
   a plurality of cells, each having an enhanced node B (ENB), such that when a quantity of the cells that will provide the MBMS is known to be one, execution of a packet data convergence protocol (PDCP)-based data compression function for the IP header occurs in the ENB of the one cell, and when the quantity of the cells that will provide the MBMS is not known to be one, execution of the PDCP-based data compression function occurs in the access gateway.

2. The system of claim 1 wherein, when the quantity of the cells that will provide the MBMS is not known to be one, the quantity of the cells is either known to be fixed and greater than one, or is potentially variable and determined by a counting procedure that counts a quantity of the cells that contain user equipment that is interested in receiving the MBMS.

3. The system of claim 1 wherein the MBMS is transmitted in each of the plurality of cells by one of point-to-point transmission and point-to-multipoint transmission.

4. The system of claim 1 wherein the IP header follows one of IP version 4 and IP version 6.

5. A wireless telecommunications network, comprising:
   an access gateway; and
   a plurality of cells, each having an enhanced node B (ENB), such that when a quantity of the cells that will provide a service is known prior to the providing of the service, a location of an execution of a packet data convergence protocol (PDCP)-based data compression function for an Internet Protocol (IP) header related to the service is determined based on the quantity, and when the quantity of the cells that will provide the service is not known prior to the providing of the service, the execution of the PDCP-based data compression function occurs on the access gateway.

6. The network of claim 5 wherein the determination based on the quantity comprises the execution of the function on one of the ENBs when the quantity is one and the execution of the function on the access gateway when the quantity is greater than one.

7. The network of claim 5 wherein the service is a multimedia broadcast multicast service (MBMS).

8. The network of claim 7 wherein at least one additional service is transmitted in one of the cells that is transmitting the MBMS when the MBMS is transmitted in the one of the cells.

9. The network of claim 5 wherein the service is transmitted in each of the plurality of cells by one of point-to-point transmission and point-to-multipoint transmission.

10. The network of claim 5 wherein the IP header follows one of IP version 4 and IP version 6.

11. A method for specifying a location for execution of a packet data convergence protocol (PDCP)-based data compression function for a service in a wireless telecommunications network including a plurality of cells, comprising:
    when a quantity of the cells that will provide the service is known, prior to the providing of the service, to be greater than one, executing the PDCP-based data compression function in a component of the network that is capable of communicating with the plurality of cells;
    when the quantity of the cells that will provide the service is not known prior to the providing of the service, executing the PDCP-based data compression function in the component of the network that is capable of communicating with the plurality of cells substantially simultaneously; and
    when the quantity of the cells that will provide the service is known, prior to the providing of the service, to be one, executing the PDCP-based data compression function in an enhanced node B (ENB) in the one cell that will provide the service.

12. The method of claim 11 wherein the component of the network that is capable of communicating with the plurality of cells is one of an access gateway and a central controller.

13. The method of claim 11 wherein the service is a multimedia broadcast multicast service (MBMS).

14. The method of claim 13 wherein at least one additional service is transmitted in one of the cells that is transmitting the MBMS when the MBMS is transmitted in the one of the cells, such that when the MBMS is provided to only the one cell, the ENB of the one cell executes the PDCP-based data compression function, and further such that when the at least one additional service is provided to more than one of the plurality of cells, the component executes the PDCP-based data compression function.

15. The method of claim 11 wherein the service is transmitted in each of the plurality of cells by one of point-to-point transmission and point-to-multipoint transmission.

16. The method of claim 11 wherein the PDCP-based data compression function is executed on an Internet Protocol (IP) header that follows one of IP version 4 and IP version 6.

* * * * *

UNITED STATES PATENT AND TRADEMARK OFFICE
CERTIFICATE OF CORRECTION

PATENT NO. : 7,715,342 B2 Page 1 of 1
APPLICATION NO. : 11/767019
DATED : May 11, 2010
INVENTOR(S) : Zhijun Cai It is certified that error appears in the above-identified patent and that said Letters Patent is hereby corrected as shown below:

Column 12, claim 11, lines 35-36, delete "substantially simultaneously"

Signed and Sealed this

Twenty-first Day of December, 2010

David J. Kappos
*Director of the United States Patent and Trademark Office*